United States Patent
Niemz et al.

(10) Patent No.: US 6,902,690 B1
(45) Date of Patent: Jun. 7, 2005

(54) METHOD AND DEVICE FOR PRODUCING CELLULOSED SHAPED BODIES

(75) Inventors: Frank Gunter Niemz, Rudolstadt (DE); Wilhelm Meyer, Rudolstadt (DE); Tanja Mainzer Althof, Genhausen (DE)

(73) Assignee: Zimmer AG, Frankfurt (DE)

( * ) Notice: Subject to any disclaimer, the term of this patent is extended or adjusted under 35 U.S.C. 154(b) by 421 days.

(21) Appl. No.: 10/070,624

(22) PCT Filed: Sep. 29, 2000

(86) PCT No.: PCT/DE00/03410

§ 371 (c)(1), (2), (4) Date: Jun. 17, 2002

(87) PCT Pub. No.: WO01/25516

PCT Pub. Date: Apr. 12, 2001

(30) Foreign Application Priority Data

Oct. 6, 1999 (DE) .......................... 199 47 910
Oct. 15, 1999 (DE) .......................... 199 49 726

(51) Int. Cl.$^7$ .......................... B29C 47/92; D01D 5/06; D01F 2/02
(52) U.S. Cl. .......................... 264/40.1; 159/5; 264/40.6; 264/178 F; 264/187; 264/203; 425/135; 425/144; 425/376.1; 425/382.2
(58) Field of Search .......................... 264/40.1, 40.6, 264/178 F, 187, 203; 425/134, 144, 376.1, 382.2, 404; 159/5

(56) References Cited

U.S. PATENT DOCUMENTS 2,777,160 A * 1/1957 Rulison et al. ............ 264/40.1
3,148,231 A * 9/1964 Spencer .................... 264/40.6

FOREIGN PATENT DOCUMENTS

| DE | 195 09 291 A1 | 9/1996 |
| EP | 0254803 A2 * | 2/1988 |
| GB | 2217848 A * | 11/1989 |
| WO | WO-9428212 A1 * | 12/1994 |

* cited by examiner

Primary Examiner—Leo B. Tentoni
(74) Attorney, Agent, or Firm—Marianne Fuierer; Steven J. Hultquist; Yongzhi Yang

(57) ABSTRACT

The invention relates to a method for producing cellulosed shaped bodies. (a) Cellulose and an aqueous aminoxide are mixed, whereby a suspension is produced. (b) A cellulose solution is produced from the suspension, whereby water evaporates. (c) A first property and a second property of the produced cellulose solution is measured and the measured value is used for correcting the composition of the solution and (d) the cellulose solution is extruded through a gap of air and into an aqueous regenerating bath where said solution is coagulated to form shaped bodies.

10 Claims, 1 Drawing Sheet

METHOD AND DEVICE FOR PRODUCING CELLULOSED SHAPED BODIES

CROSS-REFERENCE TO RELATED APPLICATIONS

This application is filed under the provisions of 35 U.S.C. §371 and claims the priority of International Patent Application No. PCT/DE00/03410 filed Sep. 29, 2000, which in turn claims priority of German Patent Application No. 199 47 910.0 filed Oct. 6, 1999 and 199 49 726.5 filed Oct. 15, 1999.

BACKGROUND OF THE INVENTION

1. Field of the Invention

The invention relates to a process for controlling the composition of solutions in the production of cellulosic shaped bodies, in which (a) cellulose and a water-containing amine oxide are mixed to form a suspension, (b) a cellulose solution is created from the suspension by vaporization of water, (c) a first property or physical behavior of the cellulose solution formed thereby is measured and the measured value is used to adjust the composition of the solution, and (d) the cellulose solution is extruded through an air gap into an aqueous regeneration bath where it is coagulated to form shaped bodies that are capable of undergoing further processing steps. The invention further relates to a device for carrying out this process with a slurrying apparatus equipped with metering devices, a dissolving and vaporizing arrangement connected to the slurrying apparatus and an extruding device connected to the dissolving and vaporizing arrangement by a conduit and having a regeneration bath attached downstream. Wherever the text of this application refers generally to a property for measurement of the cellulose solution, this should also be understood to include a physical behavior of the solution that is capable of being measured (measured variable).

2. Related Art

The properties of the cellulosic shaped bodies produced according to the amine oxide process, particularly the physical properties as textiles of the spun fibers and filaments, depend to a great extent on the composition of the spinning solution. It is therefore desirable for the achievement of optimal properties that the composition of the spinning solution be monitored and that variations be kept within narrow tolerances. From WO 94/28212, it is known to take a sample from the spinning solution upstream from the extruding device and to measure its refractive index. In order to assure satisfactory extrusion products, the refractive index should be between 1.4890 and 1.491 at 60° C. In addition to this discontinuous system of monitoring, a device for continuous measurement in the conduit, e.g. using a process refractometer, is also indicated. If the spinning solution presents a refractive index outside the refractive index cited, the feedstock for the premixer and/or the vaporization conditions must be reset.

The spinning solution is a ternary mixture of cellulose, amine oxide and water; therefore, its composition cannot be determined precisely by the measurement of only one property of the spinning solution. A number of solution compositions that fall within the solution area in the ternary system's triangle plot can be allocated to one refractive index. It is therefore not possible to control the concentration of the spinning solution precisely on the basis of the refractive index alone. The fact that a specific solution compound does not fall within the indicated refractive index range anyway is also not addressed.

SUMMARY OF THE INVENTION

The object of the present invention is to provide a process for manufacturing cellulosic shaped bodies in accordance with the amine oxide process, wherein the composition of the spinning solution can be monitored precisely. In particular, the composition of the spinning solution is to be monitored precisely so that even small deviations from a predetermined target value can be used to correct the composition of the solution. In addition, a method for preparing cellulosic shaped bodies according to the amine oxide process is proposed, wherein the composition of the spinning solution is adjusted with the smallest possible delay or dead time, so that any fluctuations in the composition are eliminated rapidly or maintained within narrow limits. Finally, a device is also proposed for performing the process, by means of which changes in the spinning solution composition, e.g. due to changes in composition of the mixing materials, can be eliminated rapidly. Further advantages are explained in the following detailed description.

This object is solved by the process according to the invention indicated in the introduction in that, in step (c), a second property, which is different from the first property of the spinning solution, is measured, the actual composition of the solution is calculated on the basis of the two measured values, and the deviation of the actual composition from a target composition is used to adjust the composition of the solution.

Unlike the known process as described in WO 94/28212, two properties of the spinning solution are measured, thus allowing the composition to be calculated precisely from the measured values. This requires that the two properties of the pure components, cellulose, amine oxide and water are known in part. If they are not known, they must be determined experimentally, if necessary also by extrapolation. The measurement of the two properties according to the invention yields the exact composition of the solution. Accordingly, in the event of even small deviations from a desired target composition in the solution, adjustments can be made to the dosages of the solution components for producing the solution, or to the operation forming the solution to compensate for the deviation. The process according to the invention thus allows of considerably more rigorous control of the solution composition than is possible if the refractive index alone is monitored and the adjustment is only activated after the value passes outside the predetermined tolerance range of the refractive index.

In the preferred embodiment of the process according to the invention, the two properties of the spinning solution are chosen from the relative permittivities, the electrical conductivity, the microwave intensity attenuation and speed, the refractive index, the density, the water content, and the ultrasonic speed. The refractive index and the density of the solution are particularly suitable for use as the two properties for measurement. The density can be measured either radiometrically or with a Coriolis force sensor. The water content can be determined by the Karl Fischer method.

In the preferred embodiment of the process according to the invention, the temperature of the cellulose solution is measured during or shortly before or after the two indicated properties are measured, and the measured values of the two solution properties or the physical behavior are adjusted and the measured values are adjusted on the basis of the measured temperature. Since the temperature of the spinning solution may vary, the measured values must be converted to the reference temperature for which the property values or behavior values of the spinning solution of the target composition are known, with which the measured values are to be compared. This reference temperature, to which the measured values must be converted, is, for example 50° C. or 60° C.

At least one of the two properties of the spinning solution is preferably measured in-line. In-line measurements not only allow rapid calculation of the solution composition, but they also limit the safety hazard from the possible initiation of uncontrollable runaway reactions due to the tendency of the solution to decompose.

In one embodiment of the process according to the invention, the solution composition is adjusted in the dosing of the components described in step (a) above. For example, if a variation is noted in the cellulose concentration of the spinning solution, it is necessary to make an alteration in the dosing system. The causes may be attributed to a change in the water content of the cellulose used, or in the solvent mixture N-methylmorpholine-N-oxide (NMMO)/$H_2O$.

In a further embodiment, the adjustment to the solution composition is made to the operating conditions in step (b). If measurements reveal a shift in the NMMO/$H_2O$ ratio, this can be corrected in step (b), for example, by increasing or reducing the rate of water vaporization at this point.

Moreover, the device according to the invention described in the introduction also presents a solution to the object of the invention in that a measuring apparatus is disposed in the conduit between the dissolving and vaporizing arrangement and the extruding device for the purpose of measuring two different properties of the solution and constitutes part of at least one controlling circuit for controlling the composition of the spinning solution. The measuring apparatus in the conduit between solution production and solution extrusion transmits signals, such as for example the refractive index and the density of the solution, by means of which a change is effected in the correcting variables, e.g. the dosing rates for cellulose and/or solvent, or the rate of water vaporization in the dissolving arrangement. The measuring apparatus consists of two instruments for measuring the different solution properties. The measuring instruments may be connected in series or in parallel. They are disposed in the conduit and provide results of measurement with no time so that dead time in the controlling circuit, and thus also fluctuations in the solution composition, are minimized. The invention also extends to the o-line arrangement of the measurement apparatus.

The measurement apparatus preferably includes a device for measuring the temperature of the solution and for compensating for the measured values of the indicated measuring instruments. In this way, the measurement apparatus returns measured values for both properties that have already been adjusted to compensate for temperature, so that these values can be compared with the property values of the spinning solution having the target composition with respect to a predetermined temperature.

The purposes of the invention are served if the measurement apparatus, together with a microprocessor and the metering devices or the dissolving and vaporizing arrangement, together form at least one control circuit. In such event, correcting variables may be, for example, the dosing rates of the metering devices or the rate of water vaporization in the dissolving arrangement.

In the following, the invention will be explained in detail with reference to the drawing and a number of experiments.

DETAILED DESCRIPTION OF THE INVENTION

Figure 1:
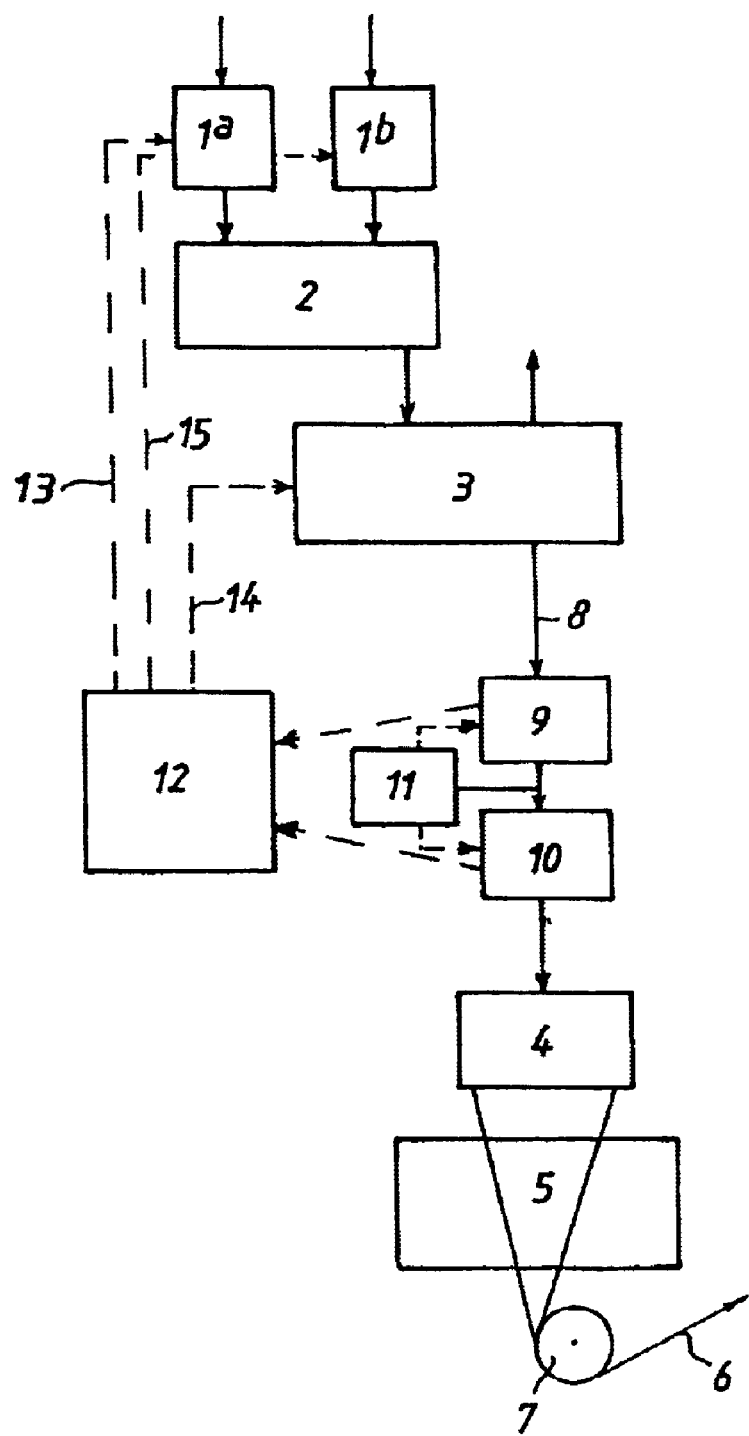
FIG. 1 shows the schematic flow diagram of an embodiment of the device according to the invention.

Water-containing cellulose and an NMMO/$H_2O$ mixture are introduced into a continuous slurrying apparatus 2 through a metering system 1. Apparatus 2 may be a multi-shaft apparatus as described in DE-C 198 37 210.8. A dissolving arrangement 3 is connected downstream of apparatus 2, wherein the suspension formed in 2 is transformed into a solution by the application of heat and negative pressure to vaporize the water. A suitable process for this purpose is known from DE-A 44 41 468.8. An extrusion tool 4 is connected to dissolving arrangement 3 by means of a conduit 8. The spinning solution is extruded by the extruding tool 4 across an air gap and into a regeneration bath 5. Depending on the type and design of the extrusion tool 4 and the subsequent operations, films, fibers, filaments or other shaped bodies may be produced. The shaped body 6 obtained thereby is passed through a discharging device 7 to subsequent treatment steps such as washing out the amine oxide, secondary treatment, cutting, drying.

The invention provides for the disposition of a measuring apparatus 9–11 in conduit 8 between the dissolving arrangement 3 and the extrusion tool 4. This consists of a measuring instrument 9 for measuring a first property of the solution, a measuring instrument 10 for measuring a second property different from the first property, and an instrument 11 for measuring the temperature of the spinning solution in conduit 8 between measuring instruments 9 and 10. As is shown, measuring instruments 9 and 10 are disposed consecutively in the flow. Measuring instruments 9 and 10 transmit signals to microprocessor 12 that are already corrected on the basis of the temperature measurements provided by instrument 11. From the signals it receives from measuring instruments 9 and 10, microprocessor 12 calculates the actual composition of the solution in conduit 8, derives the deviation from the preset target composition of the spinning solution and, from this deviation, calculates the correcting variables for metering devices $1^a$, $1^b$ and/or the operating conditions for dissolving arrangement 3. The correcting commands from microprocessor 12 are transmitted across one of signal circuits 13, 14, 15 or other signal circuits to the adjusting mechanisms concerned. Thus is demonstrated that, if the solution composition in conduit 8 deviates from the target value, the control mechanism, particularly the direct temperature compensation, according to the invention of the two measured values, allows for rapid correction, particularly since a sample does not have to be withdrawn in order for the temperature adjustment to be made.

Experiment 1

A measurement apparatus consisting of an RIS 60-3 radiation process refractometer manufactured by Risens GmbH, Jena, and an LB 386 radiometric densitometer manufactured by EG & G Berthold, Bad Wildbad, were built into the spinning solution conduit directly downstream of the dissolving apparatus in a continuously running installation for spinning Lyocell batch fibers corresponding to the Figure. Measurements of the refractive index and the density were adjusted to reflect a temperature of 50° C. in each case. From the measured values thus obtained, the percentage composition of the spinning solution was calculated. Directly after the measurement apparatus, a sample was withdrawn from the conduit through a nozzle for removing samples and tested for cellulose content (precipitation method) and water content (Karl Fischer titration). The calculated values for the composition obtained therefrom an the values for cellulose and water determined by analysis are shown in the table. A good correspondence is revealed between the composition as calculated from the two measured properties, and the composition determined by analysis.

Experiment 2

The starting conditions were the same as for experiment 1. However, the vaporization conditions were then modified in dissolving arrangement 3 such that the water was vaporized more vigorously. To this end, the vacuum in the dissolving arrangement was increased while the temperature profile and the ratio cellulose/NMMO/H$_2$O in the slurry were kept constant. The measured values for the properties obtained from the spinning solution, the values for cellulose, NMMO and water content derived therefrom, and the water and cellulose content values determined by analysis are shown in the table. This shows that the change to the vaporization conditions is reflected not only in the values obtained by direct analysis, but also in the data calculated from the solution properties.

Experiment 3

Beginning with the conditions established for experiment 2, and under constant conditions in the dissolving arrangement, the parameters for slurry preparation were temporarily changed such that the proportion of cellulose in the cellulose/NMMO/H$_2$O ratio was increased. The ratios that existed at the outlet from the dissolving arrangement after 35, 45 and 50 minutes were determined by direct analysis and by the percentage content as calculated on the basis of the properties measurements from the measurement apparatus as in experiment 1. These results are listed in rows 3a, 3b, 3c in the table. From the data presented, it is clear that temporary changes in the composition of the spinning solution can be calculated very precisely on the basis of measurements of the two solution properties.

The results of experimentation indicate that the solution composition can be calculated with extremely high accuracy from the measured values of two properties of the spinning solution, so that close control of the composition of the spinning solution is possible. Since the calculated values are available with practically no delay, the process enables finer tolerances in the composition and correspondingly reduced fluctuations in the physical properties of the shaped body formed therefrom.

| Exp. no. | Values measured by the measurement apparatus, temp.-adjusted to 50° C. | | Values calculated from the measured values | | | Values determined by analysis | |
|---|---|---|---|---|---|---|---|
| | Refractive index | Density g/ml | Cellulose %/mass | NMMO %/mass | Water %/mass | Cellulose %/mass | Water %/mass |
| 1 | 1.4847 | 1.2073 | 12.00 | 73.11 | 14.89 | 11.95 | 15.02 |
| 2 | 1.4885 | 1.2127 | 12.30 | 74.90 | 12.80 | 12.32 | 12.75 |
| 3a | 1.4890 | 1.2144 | 12.69 | 74.56 | 12.75 | 12.70 | 12.72 |
| 3b | 1.4895 | 1.2162 | 13.13 | 74.18 | 12.69 | 13.17 | 12.70 |
| 3c | 1.4897 | 1.2168 | 13.28 | 74.05 | 12.67 | 13.25 | 12.68 |

What is claimed is:

1. A process for controlling the composition of a solution in the production of cellulosic shaped bodies, the process comprising:
   (a) mixing cellulose and a water-containing amine oxide to form a suspension,
   (b) creating a cellulose solution from the suspension by vaporization of water,
   (c) measuring a first property of the cellulose solution and a second property different from the first property wherein the measured values of the first and second properties are used to calculate the actual composition of the solution and their deviation from values of a target composition is used to adjust the composition of the solution; and
   (d) extruding the cellulose solution through an air gap into an aqueous regeneration bath where it is coagulated to form shaped bodies that are capable of undergoing further processing step.

2. The process according to claim 1, wherein the first and second properties of the cellulose solution are selected from the group consisting of: relative permittivity, inductive conductivity, microwave absorption, refractive index, density, water content, and ultrasonic speed.

3. The process according to claim 2, further comprising measuring the cellulose solution's temperatures and the measured values of the first and second properties are adjusted on the basis of the measured temperature, wherein the timing of the temperature measuring is selected from the group consisting of during the measuring of the first and second property, before the measuring of the first and second property and after measuring of the first and second property.

4. The process according to claim 2, wherein at least one of the first and second property is measured in-line.

5. The process according to claim 2, wherein the solution composition is adjusted by manual intervention in the dosing of the suspension components of step (a).

6. The process according to claim 2, wherein operating conditions are adjusted by manual intervention in the operating conditions of step (b).

7. A device for performing a process for controlling the composition of a cellulose solution comprising cellulose and a water-containing amine oxide used in the production of cellulosic shaped bodies the device comprising:
   (a) a slurrying apparatus communicatively connected with at least two metering devices for metering input of the cellulose and water-containing amine oxide;
   (b) a dissolving and vaporization arrangement connected to the slurrying apparatus;
   (c) an extruding device connected by a conduit to the dissolving and vaporizing arrangement and having a regeneration bath attached downstream therefrom;
   (d) at least two measuring instruments contacting the conduit for measuring a first and a second property of the cellulose solution passing through the conduit; and
   (e) a controlling circuit for controlling the composition of the cellulose solution by determining the actual composition of the cellulose solution in the conduit from the measured values of the first and second property and to determine the deviation from a preset target composition and adjust metering devices to correct for any deviation.

8. The device according to claim 7, where in the first and second property of the cellulose solution are different and selected from the group consisting of: relative permittivity, inductive conductivity, microwave absorption, refractive index, density, water content, and ultrasonic speed.

9. The device according to claim 8, further comprising a temperature measuring instrument for measuring the temperature of the cellulose solution and to compensate for temperature in the measured values of measuring instruments.

10. The device according to claim 7, wherein the measuring instruments, a microprocessor and the metering devices form the controlling circuit.

* * * * *

UNITED STATES PATENT AND TRADEMARK OFFICE
CERTIFICATE OF CORRECTION

PATENT NO. : 6,902,690 B1
DATED : June 7, 2005
INVENTOR(S) : Frank-Gunter Niemz et al.

It is certified that error appears in the above-identified patent and that said Letters Patent is hereby corrected as shown below:

Column 6,
Line 9, "step" should be -- steps --.

Signed and Sealed this

Twentieth Day of September, 2005

JON W. DUDAS
*Director of the United States Patent and Trademark Office*